United States Patent
Schneider et al.

(10) Patent No.: US 8,162,831 B2
(45) Date of Patent: Apr. 24, 2012

(54) HAND SCANNER WITH MOVEABLE PLATEN

(75) Inventors: John K. Schneider, Snyder, NY (US); Jack C. Kitchens, Tonawanda, NY (US); Stephen M. Gojevic, Buffalo, NY (US)

(73) Assignee: Ultra-Scan Corporation, Amherst, NY (US)

( * ) Notice: Subject to any disclaimer, the term of this patent is extended or adjusted under 35 U.S.C. 154(b) by 1682 days.

(21) Appl. No.: 11/251,662

(22) Filed: Oct. 17, 2005

(65) Prior Publication Data

US 2006/0173316 A1      Aug. 3, 2006

Related U.S. Application Data

(60) Provisional application No. 60/637,314, filed on Dec. 17, 2004.

(51) Int. Cl.
*A61B 8/00* (2006.01)
(52) U.S. Cl. .......................................... 600/437
(58) Field of Classification Search ............ 82/115; 382/124–127; 600/437, 407, 438–447, 449–452
See application file for complete search history.

(56) References Cited

U.S. PATENT DOCUMENTS

| | | | |
|---|---|---|---|
| 5,448,649 A * | 9/1995 | Chen et al. ..................... | 382/126 |
| 5,479,927 A | 1/1996 | Shmulewitz | |
| 5,487,388 A | 1/1996 | Rello et al. | |
| 5,647,364 A * | 7/1997 | Schneider et al. ............ | 600/445 |
| 6,993,165 B2 * | 1/2006 | McClurg et al. .............. | 382/124 |
| 7,400,751 B2 * | 7/2008 | Schneider et al. ............ | 382/124 |

OTHER PUBLICATIONS

International Search Report for PCT/US05/37412, Jan. 29, 2007, Ultra-Scan Corporation.
Written Opinion for PCT/US05/37412, Jan. 29, 2007, Ultra-Scan Corporation.

* cited by examiner

*Primary Examiner* — Tse Chen
*Assistant Examiner* — Elmer Chao
(74) *Attorney, Agent, or Firm* — Hodgson Russ LLP

(57) ABSTRACT

A hand scanner according to the invention may obtain an image of the hand and fingers including the bracelet crease/carpel delta area and palm surface regions up to the tips of the fingers using ultrasound measurement techniques. A hand scanner according to the invention may include a movable arcuate platen and an energy transducer. In a method according to the invention, the transducer may be moved back and forth while moving a platen surface in order to advance the hand and thereby produce a raster type scan image. In this manner, the image of the hand print may be collected as a raster image representative of the scanned surface of the friction ridge skin.

7 Claims, 6 Drawing Sheets

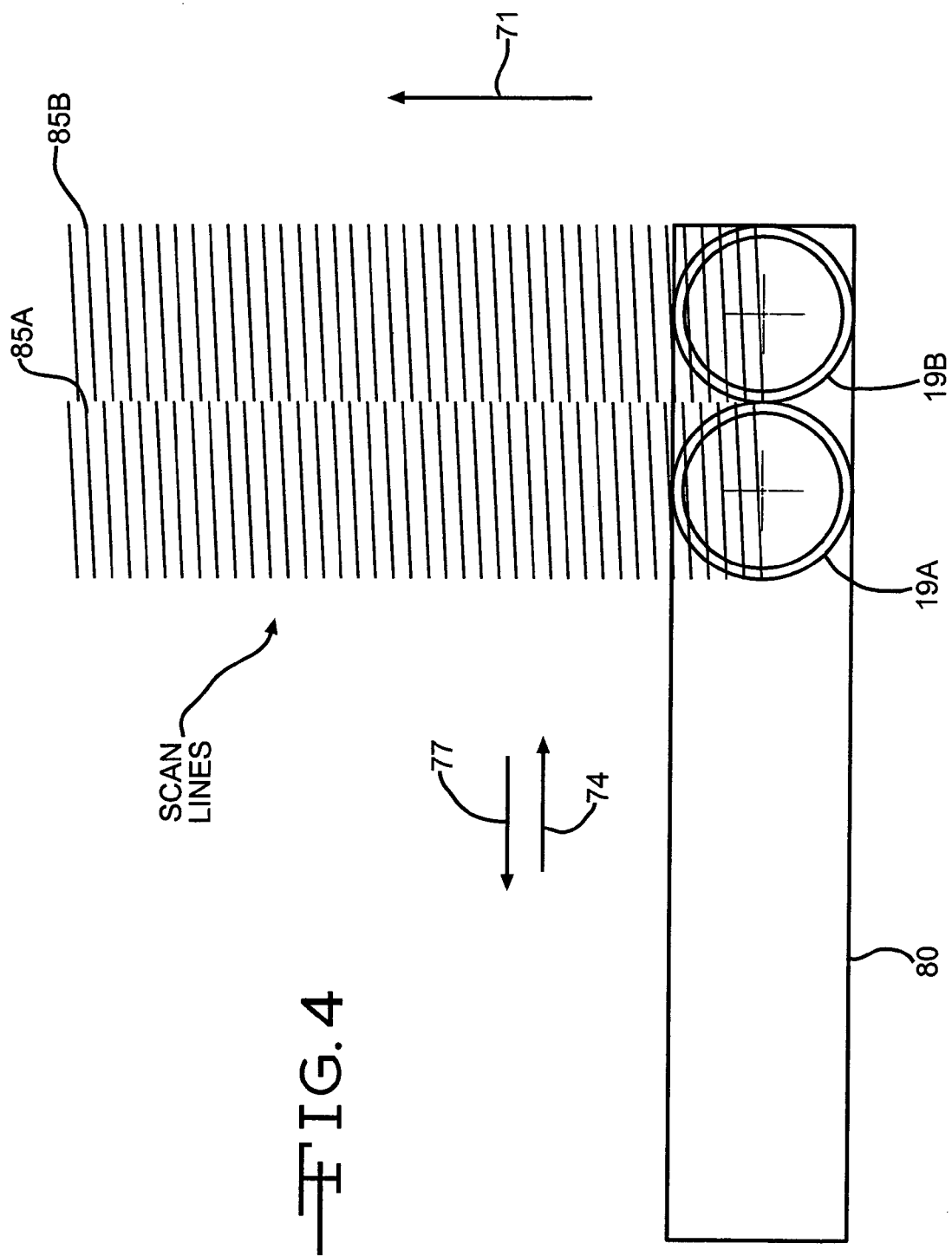

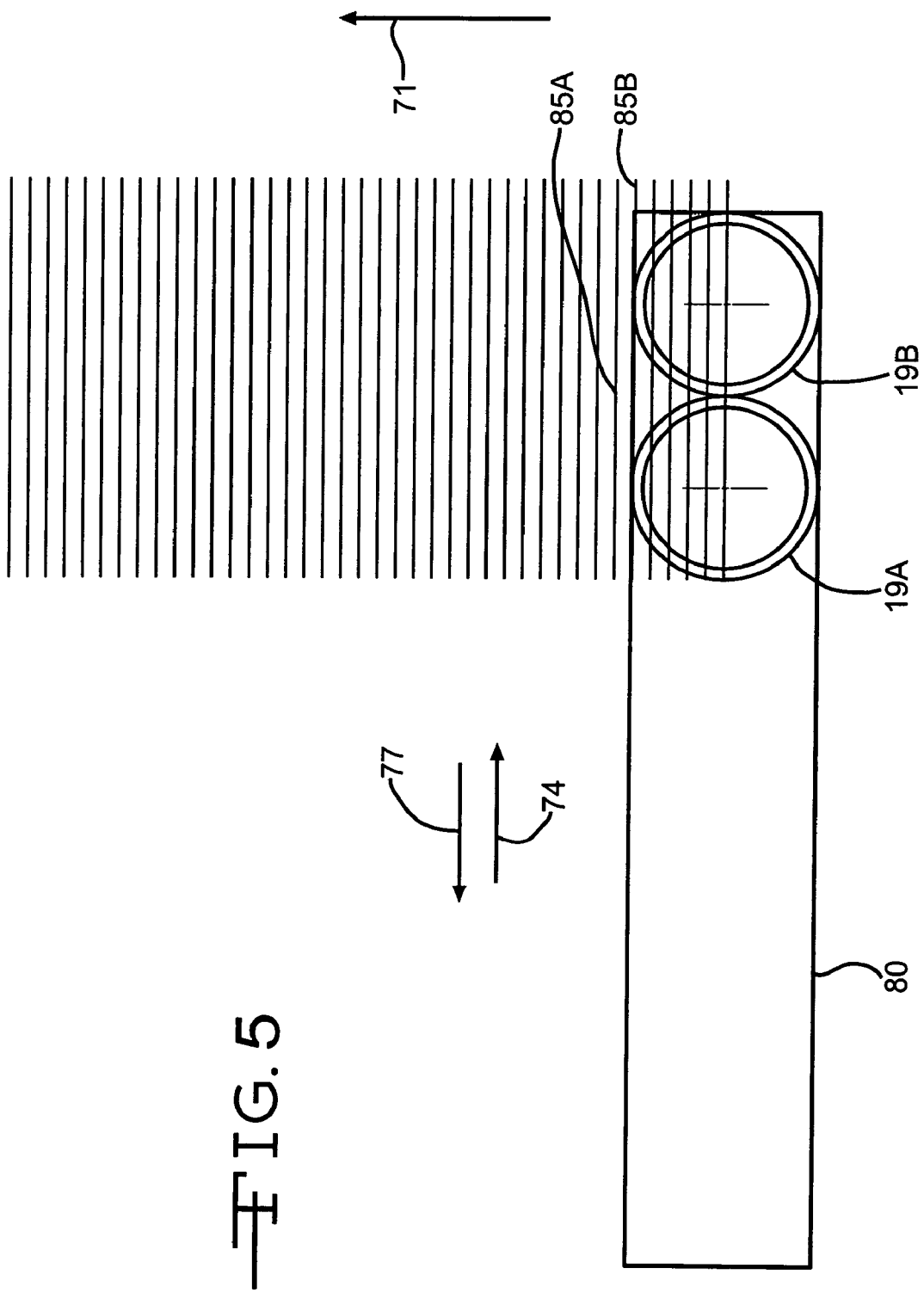

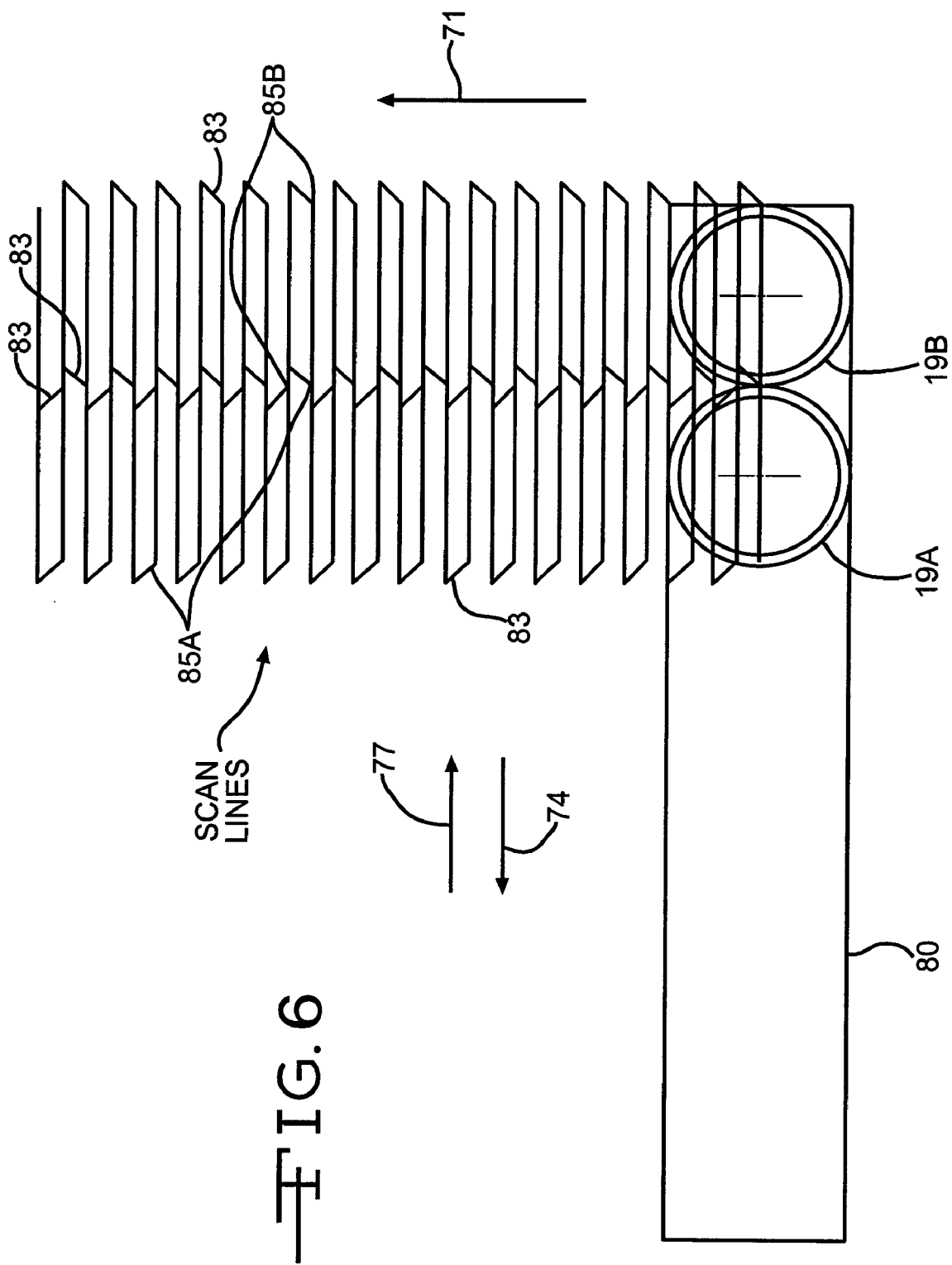

HAND SCANNER WITH MOVEABLE PLATEN

CROSS-REFERENCE TO RELATED APPLICATION

This application claims the benefit of priority to U.S. provisional patent application Ser. No. 60/637,314, filed on Dec. 17, 2004.

GOVERNMENT INTEREST

The United States government provided funding related to this invention via U.S. Department of Justice, contract no. DEA-01-C0028, and the United States government may have certain rights in the invention.

FIELD OF THE INVENTION

The present invention relates to capturing an image representing the friction ridge surface of the hand, which may include the palm region and fingers, from the area of the bracelet crease/carpel delta region of the hand to the finger tips.

BACKGROUND OF THE INVENTION

Since the 1800's fingerprint information has been collected from human fingers and hands by means of ink and paper. For purposes of this document, the term "fingerprint" is used to mean the skin surface friction ridge detail of a portion of a hand, such as a single fingerprint, or the entire hand. In recent years various electronic fingerprint scanning systems have been developed utilizing optical, capacitance, direct pressure, thermal and ultrasonic methods. Methods based on ultrasound have proven to be highly accurate, since they are insulated from the effects of grease, dirt, paint, ink and other image contaminants.

In an ultrasonic system, a piezoelectric transducer may be used to send an ultrasonic wave through an ultrasound transmitting media, such as mineral oil. In ultrasonic fingerprint scanners, the ultrasound wave is started and stopped to produce a pulse. At each material interface encountered by the pulse, a portion of the pulse reflects. For example, the interface between a platen and skin or the interface between air and skin may each reflect a portion of the pulse. The fraction of ultrasound reflected is a function of differences in impedance between the two materials comprising the interface. The fraction of ultrasound reflected can be calculated by the equation, $R=((Z_1-Z_2)/(Z_1+Z_2))^2$, where R is the fraction of sound reflected, $Z_1$ is the acoustic impedance of the first material and $Z_2$ is the acoustic impedance of the second material. Acoustic impedance is a measure of a material's resistance to the propagation of ultrasound. Acoustic impedance, Z, is defined as $Z=r \cdot c$, where r is the material density, and c is the longitudinal propagation velocity of ultrasound in the material. The larger the change in acoustic impedance, the larger the fraction reflected.

The reflected wave pulses may be detected by the transducer. The elapsed time during which the pulse traveled from the transducer to the interface and back may be determined. The elapsed time may be used to determine the distances traveled by the pulse and its reflected wave pulses. By knowing the distance traveled, the position of an interface may be determined.

There may be many interfaces encountered by the emitted pulse, and so there may be many reflected wave pulses. Since it is the interfaces associated with a finger that are of interest in generating an image of a fingerprint, it may be necessary to identify those reflected wave pulses that are associated with the finger. The approximate position of a finger being scanned may be known, and therefore the pulse reflected from the finger may be expected during a particular time interval. In a technique commonly referred to as "range gating", a detector may be configured to ignore reflected pulses that are not received during that time interval. Signals within the expected range may be interpreted to be reflected either from a ridge or a valley of the fingerprint. For example, those signals reflected from a ridge will be received before those signals reflected from a valley. The reflected signals associated with the finger may be processed and converted to a digital value representing the signal strength. The digital value may be used to produce a graphical display of the signal strength, for example by converting the digital values to a gray-scale bitmap image, thereby producing a contour map of the finger surface which is representative of the depth of the ridge structure detail.

Collecting information using an ultrasound transducer is usually accomplished by moving the ultrasound transducer side-to-side while advancing the transducer in a direction that is different from the side-to-side motion. Such an arrangement is commonly referred to as a raster scanning process. As the raster scanning process proceeds, the ultrasound raster scanning mechanism collects each pixel of image information individually, and records those pixels for use in generating an image of the fingerprint.

The prior art scanners are not able to scan more than a small portion of a hand. Since unique identifying features may be found in many areas of the hand, a scanner is needed which can provide information about larger areas of the hand.

SUMMARY OF THE INVENTION

A hand scanner according to the invention may obtain an image of the hand and fingers, including the bracelet crease/carpel delta area and palm surface regions up to the tips of the fingers, using ultrasound measurement techniques. A hand scanner according to the invention may include a movable arcuate platen and an energy transducer. The transducer may be moved back and forth while moving a platen surface in order to advance the hand and thereby produce a raster type scan image. In this manner, the image of the hand print may be collected as a raster image representative of the scanned surface of the friction ridge skin.

The invention may be embodied as a method. In one such method, a movable arcuate platen is provided. The platen may be movable in a first direction, which is substantially about an axis of rotation. An energy transducer may be provided. The transducer may be movable in a second direction, the second direction being different from the first direction. A hand may be placed on the platen, and the platen may be moved in a first direction so as to move the platen and the hand about the axis of rotation. The energy transducer may be moved in the second direction, and energy from the transducer may be sent toward the hand. At least some of the energy may be reflected from the hand, and received by the transducer. The reflected energy received by the transducer may be used to produce an image of the hand.

BRIEF DESCRIPTION OF THE DRAWINGS

For a fuller understanding of the nature and objects of the invention, reference should be made to the accompanying drawings and the subsequent description. Briefly, the drawings are:

FIG. 4, which depicts a set of scan lines corresponding to a method according to the invention;

FIG. 5, which depicts another set of scan lines corresponding to a method according to the invention; and FIG. 6, which depicts another set of scan lines corresponding to a method according to the invention.

FURTHER DESCRIPTION OF THE INVENTION

Figure 1:
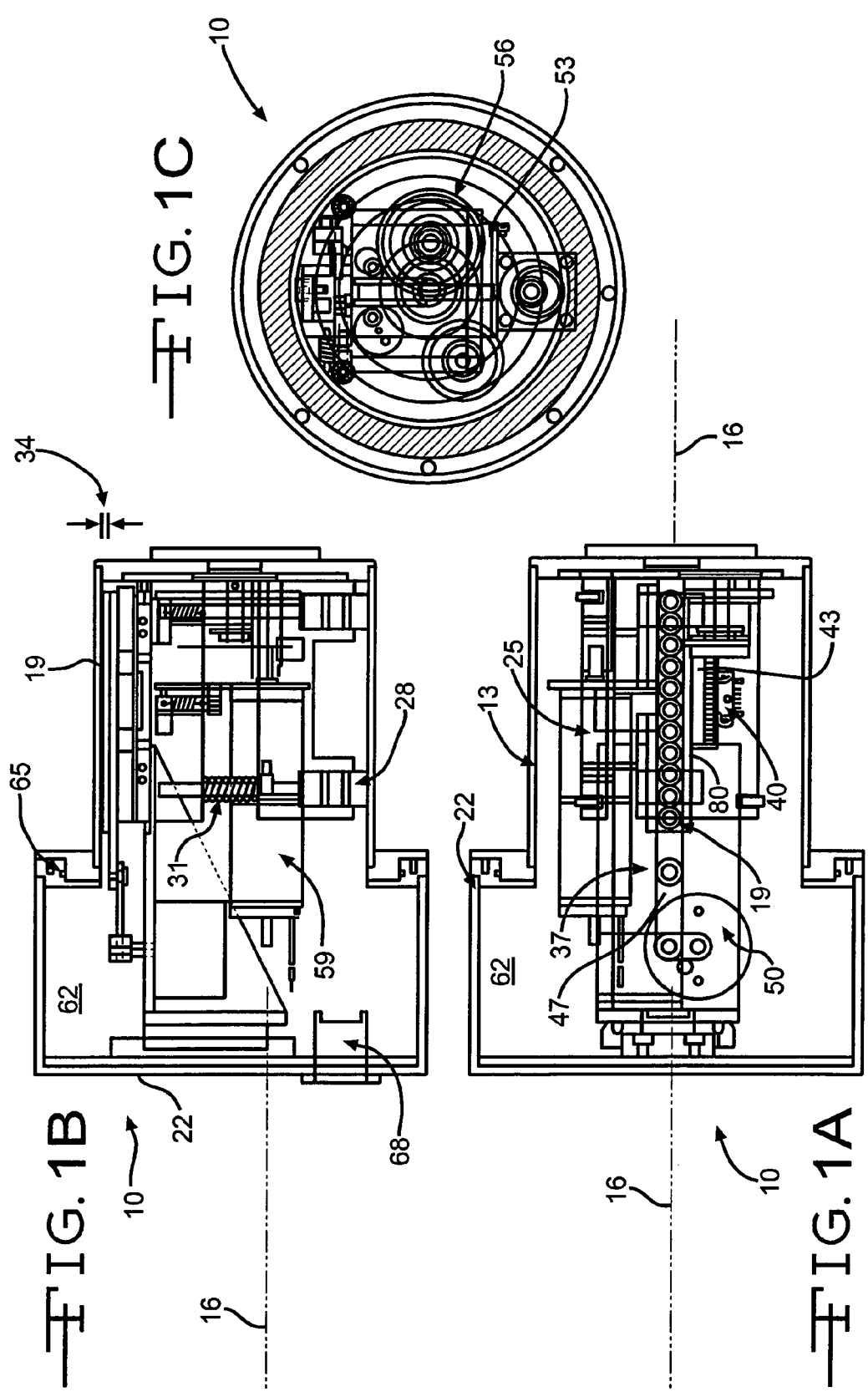
FIG. 1A, which is a plan view of a scanner according to the present invention.
FIG. 1B, which is a side view of the scanner depicted in FIG. 1A.
FIG. 1C, which is an end view of the scanner depicted in FIG. 1B.
Figure 2:
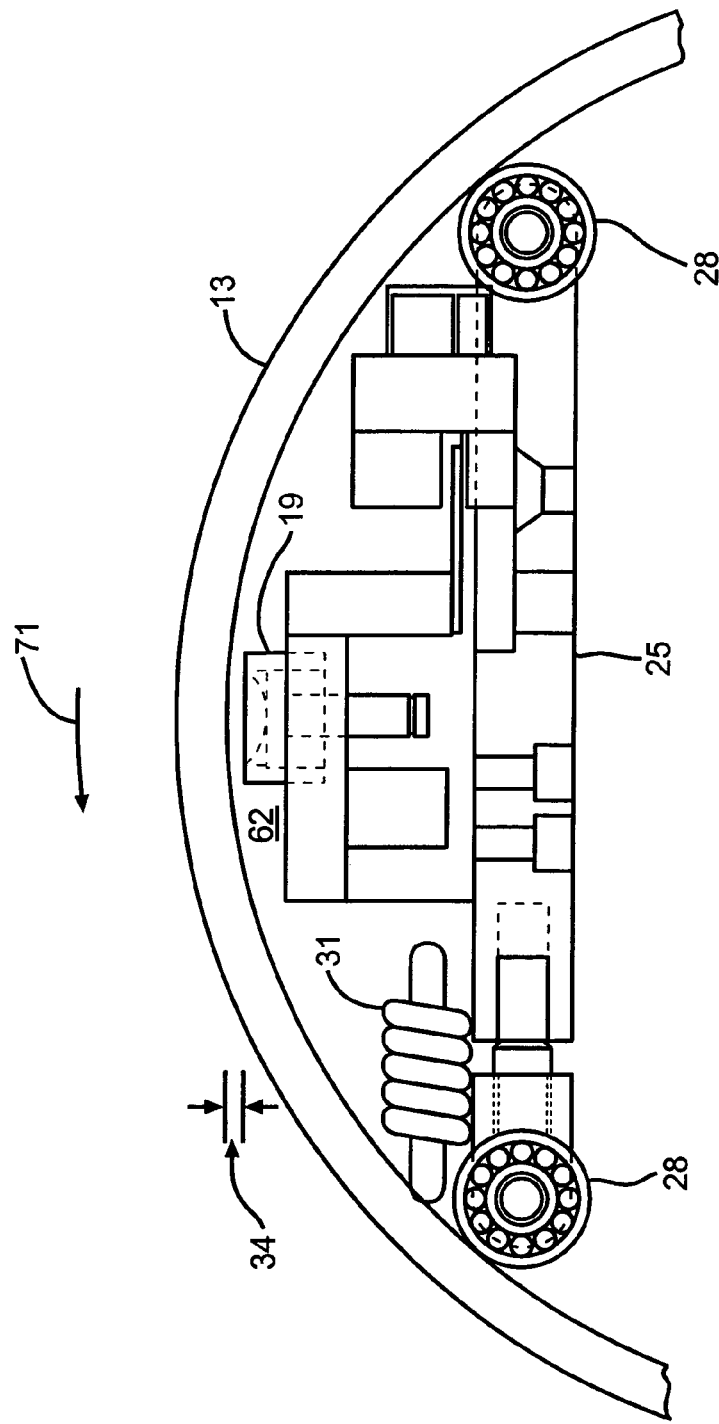
FIG. 2, which depicts part of a scanner according to the invention.

The invention may be embodied as a hand scanner 10. The scanner 10 may be used to measure and image the friction ridge surface detail of the hand. A scanner 10 according to the invention is depicted in FIGS. 1A, 1B and 1C, and a portion of that scanner 10 is depicted in FIG. 2. The scanner 10 may include a smooth synthetic-resin imaging surface or platen 13 that contacts the friction ridge skin surface of the hand. The platen 13 may be movable about an axis of rotation 16. In moving the platen 13, a hand on the platen 13 may be similarly moved by the platen 13. The platen 13 may also be arcuately shaped. For example, the platen 13 may have a cylindrical shape.

The invention may include one or more transducers 19. The use of more than one transducer 19 may allow for gathering of information quicker. Further, for a given housing 22 size, the use of more than one transducer 19 may allow for a scanned image that is wider than that produced by a single transducer 19.

The platen 13 may be made from a material that permits energy from the transducer 19 to pass through the platen 13. For example, if the energy transducer 19 is an ultrasonic transducer, the platen 13 may be made from polycarbonate.

In an embodiment of the invention, a support platform 25 may be included. The support platform 25 may be in contact with the energy transducer 19. For example, the support platform 25 may contact the platen 13 via one or more rollers 28. The energy transducer 19 may be supported so as to keep the transducer 19 at a desired distance 34 from the platen 13. The distance from the transducer 19 to the platen 13 may be important in order to obtain an accurate image. The support platform 25 may be maintained in contact with the platen 13 by the use of a spring 31 that forces the rollers 28 against the platen 13. In this manner, the distance 34 between the transducer 19 and the platen 13 may be kept to a relatively constant value.

Small adjustments to the transducer-to-platen distance 34 may be accomplished by changing the length of the support platform 25. Once the transducer-to-platen distance 34 is optimized for focus and image clarity, the length of the platform 25 may be locked and further adjustment prevented.

In the embodiment depicted in FIG. 2, two rollers 28 are shown—one at each end of the support platform 25. By keeping the rollers 28 in contact with the platen 13, the platen 13 is allowed to move relative to the support platform 25 and the transducer 19, while the distance 34 between the transducer 19 and the platen 13 remains substantially constant. To reduce the distance between the transducer 19 and the platen 13, the rollers 28 may be moved closer to each other. To increase the distance 34 between the transducer 19 and the platen 13, the rollers 28 may be moved further from each other. Consequently, the length of the support platform 25 may be altered in order to adjust the distance 34 between the platen 13 and the transducer 19.

The energy transducer 19 may be movable relative to the platen 13. A motion control system 37 may be provided for oscillating one or more transducers 19 along a substantially linear path near the surface of the platen 13. The linear path may be substantially parallel to the axis of rotation 16. In such an embodiment, if a hand is placed on the platen 13 so that the fingers are oriented perpendicular to the axis of rotation 16, then as the hand is moved by the rotating platen 13, the transducer 19 may move from left to right and from right to left as part of an effort to gather information about the hand.

Precise movement and measurement of the instantaneous position of the transducer 19 may be accomplished by the use of an optical encoder 40 and linear code strip 43, a linkage 47 and an oscillating rotary solenoid 51. The precise measurement and monitoring of the platen's 13 position may be accomplished by the use of another optical encoder 53 and code wheel 56, and a motor and gear system 59 that create and track rotation of the platen 13.

The inner chamber created by the housing 22 and platen 13 may be filled with an ultrasound transmission media 62, which may be mineral oil. A rotary seal 65 may be placed between the housing 22 and the platen 13. A piston type seal may be used for this purpose. The seal 65 may provide a leak-resistant mechanism that may allow rotary relative motion between the housing 22 and the platen 13.

There may be a need to allow for expansion and contraction of the system components. An elastomeric bellows 68 may be included in order to compensate for the mismatch in coefficients of thermal expansion between the system components, for example the housing 22, the housed components and the ultrasound transmission media 62.

Figure 3:
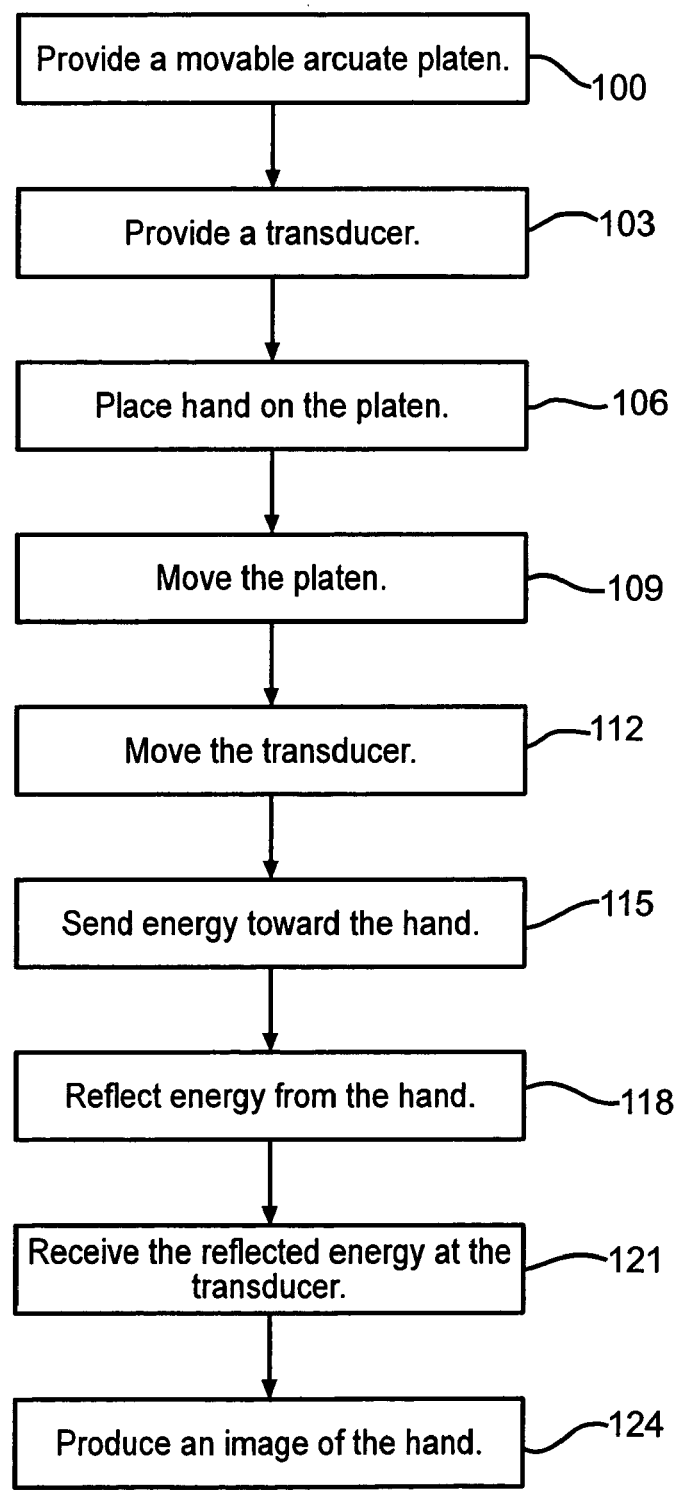
FIG. 3, which depicts a method according to the invention.

FIG. 3 illustrates a method according to the invention. In that method, a hand may be scanned, and the information gathered by the scanning operation may be used to create an image that represents the skin surface of the hand. Precise measurement of the instantaneous position of the transducer or transducer array and the position of the platen may allow an electronics system, which controls and monitors the positions, to collect data necessary to create an image of the skin surface of the hand. A computer software system suitable for displaying and extracting information from the image may be used for comparison of the gathered data to other fingerprint and handprint data, which may be available in databases associated with an identification system.

In one method according to the invention, a movable arcuate platen is provided 100. The platen may be movable in a first direction 71, which may be substantially about an axis of rotation. A transducer may be provided 103, and the transducer may be moveable in a second direction 74 that is different from the first direction 71. A hand may be placed 106 on the platen.

In one embodiment of a method according to the invention, when it is desired to gather information about the hand, the platen may be moved 109 about the axis of rotation. In this manner, the hand may also be moved about the axis of rotation. The transducer may be moved 112 relative to the platen while sending 115 energy toward the hand. For example, the transducer may be moved in a second direction 74 that is substantially parallel to the axis of rotation. The energy may be reflected 118 from the hand, and the reflected energy may be received 121 by the transducer.

The energy may be in the form of ultrasonic energy pulses. Each pulse of energy may be sent and received from a different location, thereby providing a series of data corresponding to different locations of the hand. If enough data is taken, an image of the hand may be produced 124, and that image may depict the friction ridge surface details of the hand.

The energy transducer may be moved 112 in the second direction 74 until it reaches a desired end location 85. In FIG. 6, one of the end locations 85A for the transducer 19A is identified, and one of the end locations 85B for the transducer 19B is identified. Once the end location is reached, the transducer may be moved in a third direction 77, which may be opposite to the second direction 74. In this manner, the transducer may be moved back and forth in order to gather information about the hand, which may be used to produce 124 an image of the hand.

In one embodiment of a method according to the invention, data about the hand may be gathered for use in producing 124 an image while the transducer is moving in the second direction 74 only. Any information that may be available for use while the transducer is moving in the third direction 77 may be ignored. FIG. 4 depicts scan lines indicating the locations from which data may be gathered by two transducers. It will be noticed from the scan lines, that as the transducers move 112 in the second direction 74, the platen may also be moving in the first direction 71, hence the lines appear slanted. FIG. 5 depicts scan lines that may result if the platen remains stationary while the transducer moves 112 in the second direction 74. In FIG. 5, the lines are not slanted. If the platen remains stationary while the transducer moves 112 in the second direction 74, then the platen may move 109 in the first direction 71 after the transducer reaches a desired end location 85, for example, the platen may be moved 109 in the first direction 71 while the transducer moves in the third direction 77. In each of FIG. 4 and in FIG. 5, one of the end locations 85A corresponding to transducer 19A is identified, and one of the end locations 85B corresponding to transducer 19B is identified.

In another embodiment of the invention, information about the hand may be gathered while the transducer is moving in both the second direction 74 and the third direction 77. If the platen remains stationary while the transducer is gathering information, the scan lines from which data may be gathered by the transducer may look like those shown in FIG. 6. The scan lines of FIG. 6 are those that would be traced by using two transducers. It will be recognized from FIG. 6, that when the transducer approaches an end 85 of desired travel, the speed of the transducer may be slowed, and the platen may be moved 109. If the transducer is still moving while the platen is moved 109, the scan line may angle forward as shown by the portion indicated by feature number 83. If desired, information about the hand may be ignored during the time that the scan line angles forward. Once the platen moves 109 into position to allow scanning along the next scan line, the platen movement may be stopped and the transducer's direction of travel may be reversed. Then the transducer may send 115 energy toward the hand and receive 121 reflected energy from the hand, and that received energy may be used to produce 124 an image of the hand corresponding to the scan line. If enough data is gathered for each scan line, and enough scan lines are used, the image of the hand may be precise enough to present the friction ridge detail of the hand to a viewer.

During a scanning operation, a microprocessor may synchronize and control the interaction of the scanning motion and signal processing of the transducer. For example, if the desired scanning resolution is 500 lines per inch, then to gather the information about the hand, a motor working through a set of gears may rotate the platen forward then stop at a distance equal to the desired resolution, 0.002 inches. At this time, the rotary solenoid may move the probe arm 80, having the transducers mounted thereon, along a linear path (for example), beneath the surface of the platen. During this time, the microprocessor may receive information about the position of the probe arm 80 from the interaction of the code strip and the optical encoder. When the probe arm 80 reaches an area at each end 85 of the reciprocating probe arm 80 desired sweep, the platen may be advanced so as to rotate the platen by a predetermined amount. While the probe arm 80 is in these end areas, the transducer signal may be ignored and the motor may move the platen a circumferential distance sufficient to provide the scanning resolution, in this example 0.002 inches, so that the next scan line may be parallel to the last scan line. As the probe arm 80 returns through the active scanning sector of its sweep, the microprocessor may trigger the transducer to send out an ultrasound pulse and listen for its return.

Each ultrasonic pulse from a transducer may be triggered by a signal from an optical encoder indicating that the probe arm 80 is at its next positional information point. The code strip may be constructed such that the distance between code marks is equal to or an integral multiple of the desired resolution.

The event triggering a request to the microprocessor to initiate a scanning operation can be indicated in several ways. Examples include: (1) a contact switch may be pressed by the operator, or (2) a proximity detector indicating that a finger or hand is on the platen may be used, or (3) a listening operation by the ultrasound transducer may be used whereby, several times per second the transducer sends and receives a test pulse to check for the presence of a finger, hand or other object on the platen surface.

It will be recognized that embodiments of the invention may allow for an image of the hand to be any desired length. By rotating the platen, a person's hand may be gently pulled along while the transducers sweep substantially perpendicular to the hand movement, thereby allowing for a raster scan of a desired length. For example, image information may be collected from the tips of the fingers, through the palm continuing on to the carpel delta region, the bracelet crease where the hand joins the arm at the wrist, and could continue on to reach the elbow of the arm, if desired.

U.S. provisional patent application No. 60/637,314 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:
1. A hand scanner, comprising:
an ultrasonic energy transducer;
a movable arcuate platen configured to accommodate a hand on the platen, the platen configured to move about an axis of rotation and about the energy transducer, and configured to accommodate moving the hand about the axis of rotation; and,
a support platform having rollers in contact with the platen, a first of the rollers being positioned near an end of the platform and a second of the rollers being positioned near another end of the platform, and thereby configured to maintain a distance between the transducer and the platen as the platen moves relative to the support platform;

wherein the energy transducer is configured to move relative to the support platform and the platen, and in a direction that is substantially parallel to the axis of rotation, and wherein the energy transducer is configured to send energy to the hand, and receive energy from the hand.

2. The scanner of claim 1, wherein the support platform is in contact with the energy transducer.

3. The scanner of claim 2, wherein the support platform has a length that can be altered in order to adjust a distance between the platen and the transducer.

4. A method of scanning a hand, comprising:
(a) providing an ultrasonic energy transducer;
(b) providing a movable arcuate platen, the platen being movable substantially about an axis of rotation;
(c) providing a support platform having rollers in contact with the platen, a first of the rollers being positioned near an end of the platform and a second of the rollers being positioned near another end of the platform, and thereby maintaining a distance between the transducer and the platen as the platen moves relative to the support platform and relative to the energy transducer about the axis of rotation;

wherein the energy transducer is movable relative to the support platform and the platen along an axis substantially parallel to the axis of rotation;
(d) placing a hand on the platen;
(e) moving the platen so as to move the platen and the hand about the axis of rotation;
(f) moving the energy transducer in the a first direction;
(g) sending energy toward the hand;
(h) reflecting at least some of the energy from the hand;
(i) receiving the energy reflected from the hand to provide reflected energy; and
(j) using the reflected energy to produce an image of the hand.

5. The method of claim 4, further comprising moving the energy transducer in a direction opposite to the first direction.

6. The method of claim 4, further comprising repeating steps (f) through (i) while the transducer is moving in the opposite direction.

7. The method of claim 4, further comprising stopping the platen while the energy transducer is moving in the first direction.

\* \* \* \* \*

UNITED STATES PATENT AND TRADEMARK OFFICE
CERTIFICATE OF CORRECTION

| | | |
|---|---|---|
| PATENT NO. | : 8,162,831 B2 | Page 1 of 1 |
| APPLICATION NO. | : 11/251662 | |
| DATED | : April 24, 2012 | |
| INVENTOR(S) | : Schneider et al. | |

It is certified that error appears in the above-identified patent and that said Letters Patent is hereby corrected as shown below:

At column 8, line 10, in claim 4, part "f", delete "the a" and replace with: --a--

At column 8, line 25, insert the following claim:
--8. The scanner of claim 1, wherein the energy transducer is movable along a substantially linear path.--

Signed and Sealed this
Twenty-sixth Day of June, 2012

David J. Kappos
*Director of the United States Patent and Trademark Office*